Jan. 17, 1928.
I. A. POLUS
1,656,337
CULTIVATOR GUIDING DEVICE
Filed June 19, 1924     2 Sheets-Sheet 1
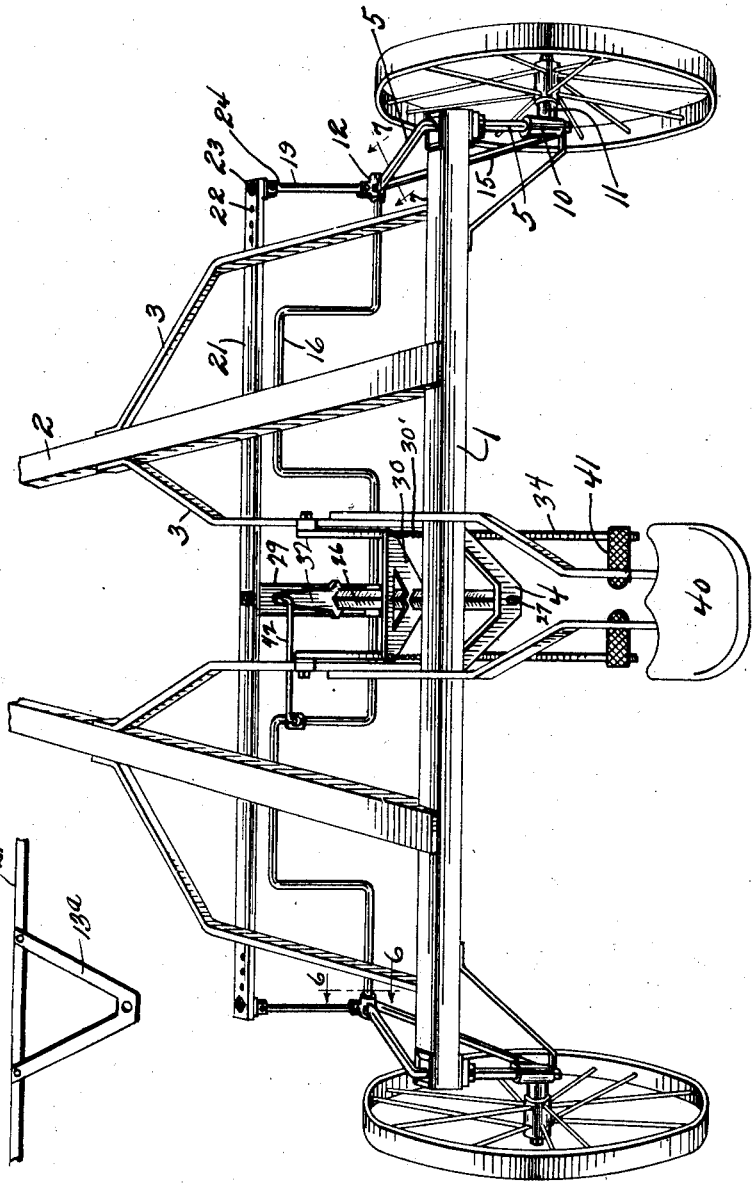
Witnesses
Inventor
I. A. Polus
By Richard B. Owen,
Attorney Jan. 17, 1928.  
I. A. POLUS  
1,656,337  
CULTIVATOR GUIDING DEVICE  
Filed June 19, 1924  
2 Sheets-Sheet 2
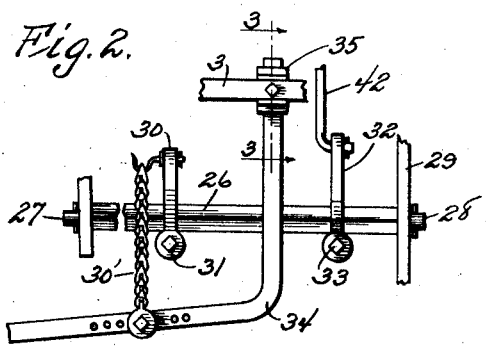
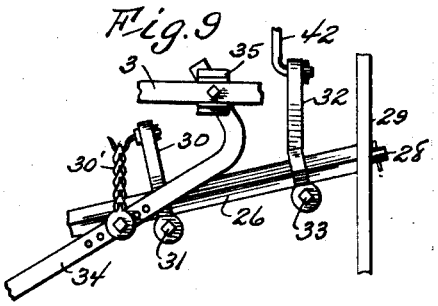
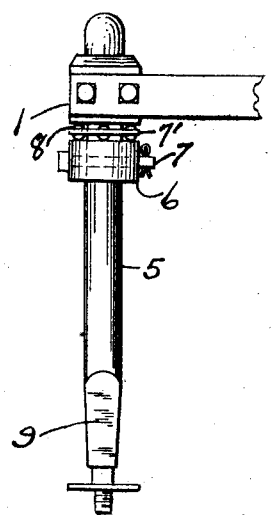
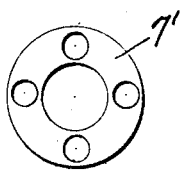
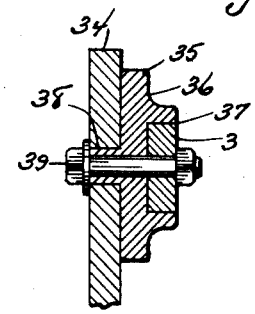
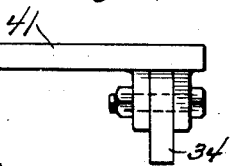
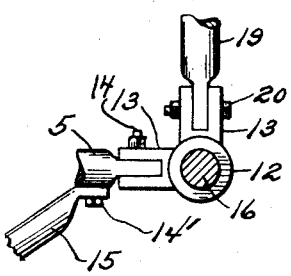
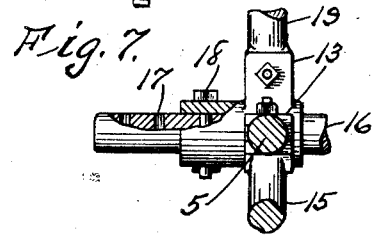
WITNESSES
Inventor  
I. A. Polus  
By Richard B. Owen,  
Attorney Patented Jan. 17, 1928.

1,656,337

UNITED STATES PATENT OFFICE.

IGNACY A. POLUS, OF MITCHELL, SOUTH DAKOTA.

CULTIVATOR-GUIDING DEVICE.

Application filed June 19, 1924. Serial No. 721,081.

The present invention relates to a guiding or steering mechanism for cultivators and other similar agricultural implements. The invention contemplates a structure for turning the wheels of an agricultural implement from the driver's seat controlling them by foot operated means.

The invention further contemplates the provision of a comparatively simple structure which will be efficient, reliable, easy to manipulate, readily associated with a large number of different types of agricultural machinery, comparatively inexpensive to manufacture, durable, strong, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawings:

Figure 1 is a perspective view of a cultivator carriage showing my invention associated therewith, Figure 2 is a detail elevational view showing the rocker shaft of the guiding mechanism with its associated members, Figure 3 is a detail section taken on line 3—3 of Figure 2, Figure 4 is a detail view of one of the cranks used with the mechanism, Figure 5 is a plan view of bearing plate 7', Figures 6 and 7 are detail views on an enlarged scale taken substantially on the line 6—6 and 7—7 of Figure 1 respectively, Figure 8 is a detail elevation of one of the pedals, Figure 9 is a view similar to Figure 2 showing the rocker shaft on an incline which is necessary in certain types of cultivators, and Figure 10 is a detail view showing a modified form of the hanger bar.

Referring to the drawing in detail it will be seen that 1 designates the main beam of a cultivator extending forwardly from which are the two tongues 2 which are braced by bars 3. The inner bars 3 terminate at their rear end in a V-shaped extension 4 which is apertured. Cranks 5 extend through the ends of the beam 1 and bearing blocks 6 are fixed thereto by pins 7. A ball bearing mechanism 8 including plate 7' is disposed above each block 6 and the beam 1 rests thereon. The lower ends of the crank are squared as at 9 for receiving sleeves 10 from which extend trunnions 11. These cranks, sleeves and trunnions form the steering knuckles of the cultivator. The ends of the upper arms of cranks 5 are connected to couplings 12. These couplings are provided with angularly disposed lugs 13 having slots therein. As is seen to advantage in Figure 6 the lower lugs 13 receive the terminals of the cranks and are held in engagement therewith by bolts 14. Bracing rods 15 are connected to the arms 5 by the bolts 14'.

A connecting rod 16 is received in the bodies of the couplings 12, the ends of this rod being provided with a series of openings 17 for receiving bolts 18 which also pierce the couplings and thus the couplings may be adjusted on this rod. This rod 16 is shaped to conform to the peculiarities of various agricultural implements. Bars 19 are connected to the upper lugs 13 by bolts 20 and adjustably engage an upper connecting rod 21 which is provided with the series of apertures 22 at its ends in order that bolts 23 from couplings 24 extend therethrough.

A shaft 26 non-circular in cross section is provided with reduced circular ends 27 and 28. The end 27 pierces the apertures in the extension 4 so that the shaft is rotatable and also capable of swinging. The reduced end 28 pierces a hanger bar 29 shown in Figure 1 or bar 13ª shown in Figure 10 depending from the upper connecting rod 21. A double crank 30 in the form of a triangular shaped plate is engaged with the shaft being slidable thereon when bolt 31 is loosened but rotatable therewith. Double crank 30 to have three holes near each outer end to receive chain 30' in such a manner so as to make this joint adjustable. A crank 32 is also mounted on the shaft 26 and may be slid thereon when bolt 33 is loose. The crank 30 is adapted to rotate or rock the shaft 26 while crank 32 is swung upon rocking of the shaft. The two levers 34 are pivoted at their forward ends to brackets 35. These brackets 35 consist of body plates 36 having grooves 37 therein for the reception of the inner arms 3. On the sides of the body plates opposite to the grooves 37 there are provided hollow trunnions 38. Bolts 39 pierce the arms 3, body plates 36, and trunnions 38 so as to hold the levers 34 into pivotal engagement with the arms 3. These levers extend rearwardly and terminate a little forwardly and below the driver's seat 40 and pedals 41 are provided on their rear extremities in order that the feet of the operator may rest thereon.

If it is desired to steer the vehicle to the right the pedal 41 to the right is depressed thus swinging the lever positioned to the right. This causes the swinging of crank 30 and the rocking of shaft 26 (in Figure 1) in a clockwise direction, thus similarly swinging the crank 32 and pulling the link 42 to the right which is connected to the lower connecting rod 16. Crank 32 to have three holes near its top end to receive rod 42 in order to make this joint adjustable. This connecting rod 16 is therefore pushed to the right and the rocker shaft is also slightly swung to the right. This causes the rotation of the cranks 5 to swing the wheels so that the cultivator carriage tends to move to the right. In order to steer the vehicle to the left it is, of course, evident that the pedal to the left should be depressed.

From the above description it is thought that the construction and operation of the invention will be readily understood without a further detail description thereof. It is also evident that the steering mechanism may be associated with various different types of cultivators and other agricultural machines to advantage. While the preferred embodiments of the invention have been described in detail, it will be understood that I do not wish to be limited to the particular construction set forth, since various changes in the form, materials, proportions and arrangement of parts, and in the details of construction may be resorted to without departing from the spirit or scope of the invention as hereinafter claimed or destroying any of its advantages.

Having thus described my invention, what I claim as new is:

In an agricultural implement, a frame, wheel engaging cranks pivotally mounted adjacent the ends of the frame, a connecting rod pivotally secured to the projections of the wheel supporting cranks, a non-circular horizontal rock shaft rotatably mounted on the intermediate portion of the frame, a pair of operating pedals pivotally secured to the frame adjacent the rock shaft, an operating crank slidably mounted on the rock shaft and extending upwardly therefrom, means for connecting the intermediate portions of the pedals with the ends of the rock shaft cranks for rotary movement thereof, a second crank extension adjustably mounted on said rock shaft to rotate with the crank, and a connecting link pivotally connected to the last mentioned crank and connecting rod for turning the wheel cranks and wheels.

In testimony whereof I affix my signature.

IGNACY A. POLUS